(12) United States Patent
Badea

(10) Patent No.: US 8,745,381 B2
(45) Date of Patent: Jun. 3, 2014

(54) METHODS, SYSTEMS, AND COMPUTER READABLE MEDIA FOR PERFORMING ENCAPSULATING SECURITY PAYLOAD (ESP) REHASHING

(75) Inventor: Alexandru R. Badea, Bucharest (RO)

(73) Assignee: IXIA, Calabasas, CA (US)

( * ) Notice: Subject to any disclaimer, the term of this patent is extended or adjusted under 35 U.S.C. 154(b) by 12 days.

(21) Appl. No.: 13/276,906

(22) Filed: Oct. 19, 2011

(65) Prior Publication Data
US 2013/0103940 A1    Apr. 25, 2013

(51) Int. Cl.
*H04L 29/06*    (2006.01)
(52) U.S. Cl.
USPC ............. 713/160; 713/163; 713/189; 726/14; 726/15; 726/26
(58) Field of Classification Search
None
See application file for complete search history.

(56) References Cited

U.S. PATENT DOCUMENTS

| | | | |
|---|---|---|---|
| 8,160,089 B1* | 4/2012 | Padiyar et al. | 370/445 |
| 2002/0097724 A1* | 7/2002 | Halme et al. | 370/392 |
| 2002/0191791 A1* | 12/2002 | Anand | 380/255 |
| 2002/0191793 A1* | 12/2002 | Anand et al. | 380/255 |
| 2005/0256975 A1* | 11/2005 | Kaniz et al. | 709/250 |
| 2006/0020807 A1* | 1/2006 | Aura et al. | 713/176 |
| 2006/0149965 A1* | 7/2006 | Sharma | 713/163 |
| 2007/0147397 A1* | 6/2007 | Aaron et al. | 370/401 |
| 2007/0165638 A1* | 7/2007 | Hasani et al. | 370/392 |
| 2009/0133089 A1* | 5/2009 | Ku et al. | 725/131 |
| 2010/0031024 A1* | 2/2010 | Hayes | 713/156 |
| 2010/0071055 A1* | 3/2010 | Kaniz et al. | 726/14 |
| 2010/0125915 A1* | 5/2010 | Hall et al. | 726/26 |
| 2010/0185680 A1* | 7/2010 | Gilboa | 707/802 |
| 2010/0189103 A1* | 7/2010 | Bachmann et al. | 370/389 |
| 2010/0232503 A1* | 9/2010 | Morimoto et al. | 375/240.13 |
| 2010/0268963 A1* | 10/2010 | Iizuka et al. | 713/189 |
| 2011/0013634 A1* | 1/2011 | Swander et al. | 370/394 |
| 2011/0138458 A1* | 6/2011 | Kumar et al. | 726/15 |
| 2011/0296186 A1* | 12/2011 | Wong et al. | 713/171 |
| 2011/0314274 A1* | 12/2011 | Swartz | 713/160 |

OTHER PUBLICATIONS

Housley, "Using Advanced Encryption Standard (AES) CCM Mode with IPsec Encapsulating Security Payload (ESP)," Network Working Group, RFC 4309 (Dec. 2005).
Kent, "IP Encapsulating Security Payload (ESP)," Network Working Group, RFC 4303 (Dec. 2005).
Kent, "Security Architecture for the Internet Protocol," Network Working Group, RFC 4301 (Dec. 2005).

\* cited by examiner

*Primary Examiner* — Ashok Patel
*Assistant Examiner* — Gary Gracia
(74) *Attorney, Agent, or Firm* — Jenkins, Wilson, Taylor & Hunt, P.A.

(57) ABSTRACT

Methods, systems, and computer readable media for accelerating stateless IPsec traffic generation by performing ESP rehashing of ESP packets are disclosed. A first ESP packet is generated by encrypting a portion of the packet and adding ESP headers and trailers to the encrypted portion, hashing the encrypted portion and the ESP header to compute a first ESP integrity check value (ICV), and adding the ESP ICV as a trailer to the ESP packet. At least one second ESP packet is generated by modifying parameters in the first ESP packet. The first and second ESP packets are transmitted to a device under test.

12 Claims, 4 Drawing Sheets

METHODS, SYSTEMS, AND COMPUTER READABLE MEDIA FOR PERFORMING ENCAPSULATING SECURITY PAYLOAD (ESP) REHASHING

TECHNICAL FIELD

The subject matter described herein relates to generating ESP packets for testing the performance of telecommunications equipment. More specifically, the subject matter relates to methods, systems, and computer readable media for performing ESP rehashing.

BACKGROUND

IPsec is a protocol suite for securing IP communications by authenticating and encrypting each IP packet of a communication session. IPsec includes protocols for establishing mutual authentication between agents at the beginning of the session and negotiation of cryptographic keys to be used during the session. IPsec is an end-to-end security scheme operating in the Internet protocol (IP) Layer of the internet protocol suite. It can be used for protecting data flows between a pair of hosts (host-to-host), between a pair of security gateways (network-to-network), or between a security gateway and a host (network-to-host). Internet key exchange (IKEv1 or IKEv2) is a protocol used to set up a security association (SA) in the IPsec protocol suite. IKE uses a key exchange to set up a shared session secret, from which cryptographic keys may be derived. Public key techniques or, alternatively, a pre-shared key, may be used to mutually authenticate the communicating parties. Encapsulating security payload (ESP) is a member of the IPsec protocol suite (ESP operates directly on top of IP) and provides origin authenticity, integrity, and confidentiality protection of packets. Unlike authentication header (AH), ESP does not protect the IP packet header. However, in tunnel mode, where the entire original IP packet is encapsulated with a new packet header added, ESP protection is afforded to the whole inner IP packet (including the inner header) while the outer header remains unprotected. IPsec is defined in Internet engineering task force (IETF) request for comments (RFC) 4301 and 4309 which are incorporated by reference herein in their entireties. ESP is defined in IETF RFC 4303 which is incorporated by reference herein in its entirety.

In telecommunications equipment performance testing environments, it may be desirable to generate traffic that is stateless and encapsulated in ESP. Conventionally, performance testing includes generating a stream of cleartext stateless packets, such as user datagram protocol (UDP) packets, and then applying encryption and hashing operations associated with ESP encapsulation to each packet. However, the number of encryption operations resulting from conventional methods may be computationally burdensome and may limit how quickly packets are generated for performance testing purposes. As networks handle greater volumes of traffic and network devices increase in performance, so too must testing equipment keep pace in order to accurately test the performance of emerging networks and network equipment.

Accordingly, in light of these difficulties, a need exists for improved methods, systems, and computer readable media for reducing the number of required encryption operations associated with generating a stream of stateless packets for performance testing of telecommunications equipment.

SUMMARY

Methods, systems, and computer readable media for accelerating stateless IPsec traffic generation by performing ESP rehashing of ESP packets are disclosed. According to one method, a first ESP packet is generated by encrypting a portion of the packet and adding ESP headers and trailers to the encrypted portion, hashing the encrypted portion and the ESP header to compute a first ESP integrity check value (ICV), and adding the ESP ICV as a trailer to the ESP packet. At least one second ESP packet is generated by modifying at least one parameter in the ESP header of the first ESP packet, hashing the modified ESP header and the encrypted portion of the first ESP packet to compute a second ESP ICV for the at least one second ESP packet, and replacing the first ESP ICV with the second ESP ICV in the at least one second ESP packet. The first and the at least one second ESP packets are transmitted to a device under test to test an aspect of the device under test.

A packet traffic generator for accelerating stateless IPsec traffic generation by performing ESP rehashing of ESP packets is also disclosed. The packet traffic generator includes an ESP packet generation module that is configured to generate a first ESP packet by encrypting a portion of the packet and adding ESP headers and trailers to the encrypted portion, hashing the encrypted portion and the ESP header to compute a first ESP integrity check value (ICV), and adding the ESP ICV as a trailer to the ESP packet. An ESP rehashing module is configured to generate at least one second ESP packet by modifying at least one parameter in the ESP header of the first ESP packet, hashing the modified ESP header and the encrypted portion of the first ESP packet to compute a second ESP ICV for the at least one second ESP packet, and replacing the first ESP ICV with the second ESP ICV in the at least one second ESP packet. The ESP rehashing module is further configured to transmit the first and the at least one second ESP packets to a device under test to test an aspect of the device under test.

The subject matter described herein can be implemented in software in combination with hardware and/or firmware. For example, the subject matter described herein can be implemented in software executed by a processor. In one exemplary implementation, the subject matter described herein can be implemented using a non-transitory computer readable medium having stored thereon executable instructions that when executed by the processor of a computer control the processor to perform steps. Exemplary non-transitory computer readable media suitable for implementing the subject matter described herein include chip memory devices or disk memory devices accessible by a processor, programmable logic devices, and application specific integrated circuits. In addition, a computer readable medium that implements the subject matter described herein may be located on a single computing platform or may be distributed across plural computing. platforms.

BRIEF DESCRIPTION OF THE DRAWINGS

The subject matter described herein will now be explained with reference to the accompanying drawings of which.

DETAILED DESCRIPTION

The subject matter described herein includes methods, systems, and computer readable media for performing ESP rehashing. Specifically, the ESP rehashing techniques disclosed herein may be useful for performing performance testing of telecommunications equipment such as gateways by reducing the number of encryption operations required to be performed by the test packet traffic generator. It may be appreciated that for testing purposes the payload content of test packets may not be important for evaluating a device under test (DUT) and that therefore a dummy payload may be used and/or re-used for multiple packets in a packet stream. Additionally, for purposes herein, a stateful packet stream may be a logically interconnected series of packets such that removal of one packet damages the integrity of the stream. By contrast, in a stateless packet stream, each packet may be considered individually. One example of a stateless packet may be a UDP packet stream for providing voice over Internet protocol (VoIP) communications. As will be described in greater detail below, by performing ESP rehashing for one or more ESP packets within a generated stateless packet stream used for testing purposes, the subject matter described herein may accelerate stateless IPsec traffic generation by avoiding the encryption operations performed for every packet as required by conventional methods and test equipment.

Figure 1:
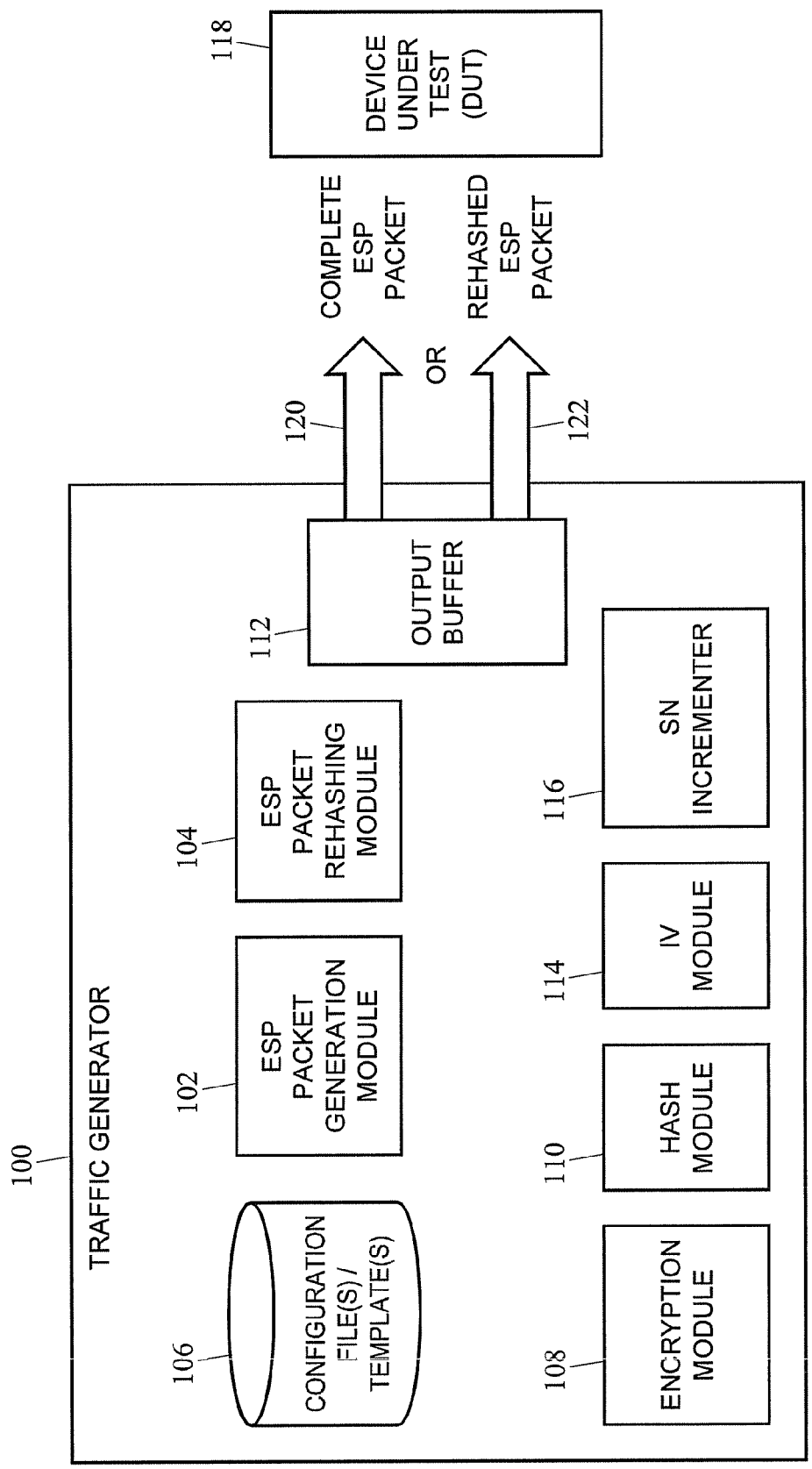
FIG. 1 is a block diagram of an exemplary system for performing ESP rehashing according to an embodiment of the subject matter described herein.

FIG. 1 is a block diagram of an exemplary system for performing ESP rehashing according to an embodiment of the subject matter described herein. In FIG. 1, traffic generator 100 may be a hardware device containing one or more modules for generating complete ESP packets and/or rehashed ESP packets suitable for performance testing. Traffic generator 100 may include ESP packet generation module 102 for generating complete ESP packets and ESP packet rehashing module 104 for generating rehashed ESP packets. Modules 102 and 104 may coordinate the functions provided by one or more additional modules (as described in greater detail below) or may provide separate functionality. Encryption module 108 may perform encryption on cleartext packets. Hashing module 110 may hash one or more portions of a packet including ESP packets having encrypted cleartext packet portions in order to compute an integrity check value (ICV). The ICV may be appended (or inserted) to an ESP packet after the ESP trailer. Output buffer 112 may store one or more portions of an ESP packet while it is being constructed and queue packets for transmission. Initialization value (IV) module 114 may generate an IV for writing to output buffer 112. Device under test (DUT) 118 may be telecommunications hardware equipment, such as a gateway, that includes one or more interfaces for receiving ESP packets. Sequence number (SN) incrementer may increment a SN and write the SN to output buffer 112.

In order to generate a complete ESP packet, traffic generator 100 may retrieve a traffic generator configuration/encapsulation template stored in configuration file/template database 106. The traffic generator configuration may specify: an encapsulation header, a cleartext template, and IPsec security association (SA) data. The cleartext template may contain data to be encapsulated in ESP, such as an inner IP header, inner UDP header, and a payload. It may be appreciated that for purposes of performance testing, a dummy payload may be used when generating an ESP packet according to the subject matter described herein. The IPsec SA data may include any algorithms and keys necessary for establishing an IPsec SA, where establishing the IPsec SA includes producing keys and algorithm values that are necessary for encapsulating traffic protected by the SA.

Traffic generator 100 may then allocate a portion of output buffer 112 and copy the encapsulation template to output buffer 112. The ESP header, including an SPI and sequence number, may be written to output buffer 112. IV module 114 may generate a random IV which may be written to output buffer 112. Then, module 102 may copy the cleartext template into output buffer 112, followed by a proper ESP trailer. Then, encryption module 108 may encrypt the output buffer portion starting immediately after the IV. ICV module 116 may then compute an ICV over the portion of output buffer 112 starting with the ESP header and may append the ICV to output buffer 112. Finally, the contents of output buffer 112, being a complete ESP packet, may be queued for transmission.

The complete ESP packet generated as described above may fully conform to current technical specifications and requirements. Many operational specifications require non-predictable (e.g., random) IVs to be generated for every packet in order to guarantee confidentiality. However, because confidentiality may not be an issue in a performance testing environment, re-using IVs may be acceptable in a performance testing environment, such as the environment described herein. Therefore, in an additional embodiment, IV module 114 may be configured to re-use (i.e., copy) a previously generated IV rather than randomly generate a new IV for each ESP packet. It should be noted that each of the modules 102-112 may include a hardware component, such as a processor and memory, for implementing the described functions.

Figure 2:
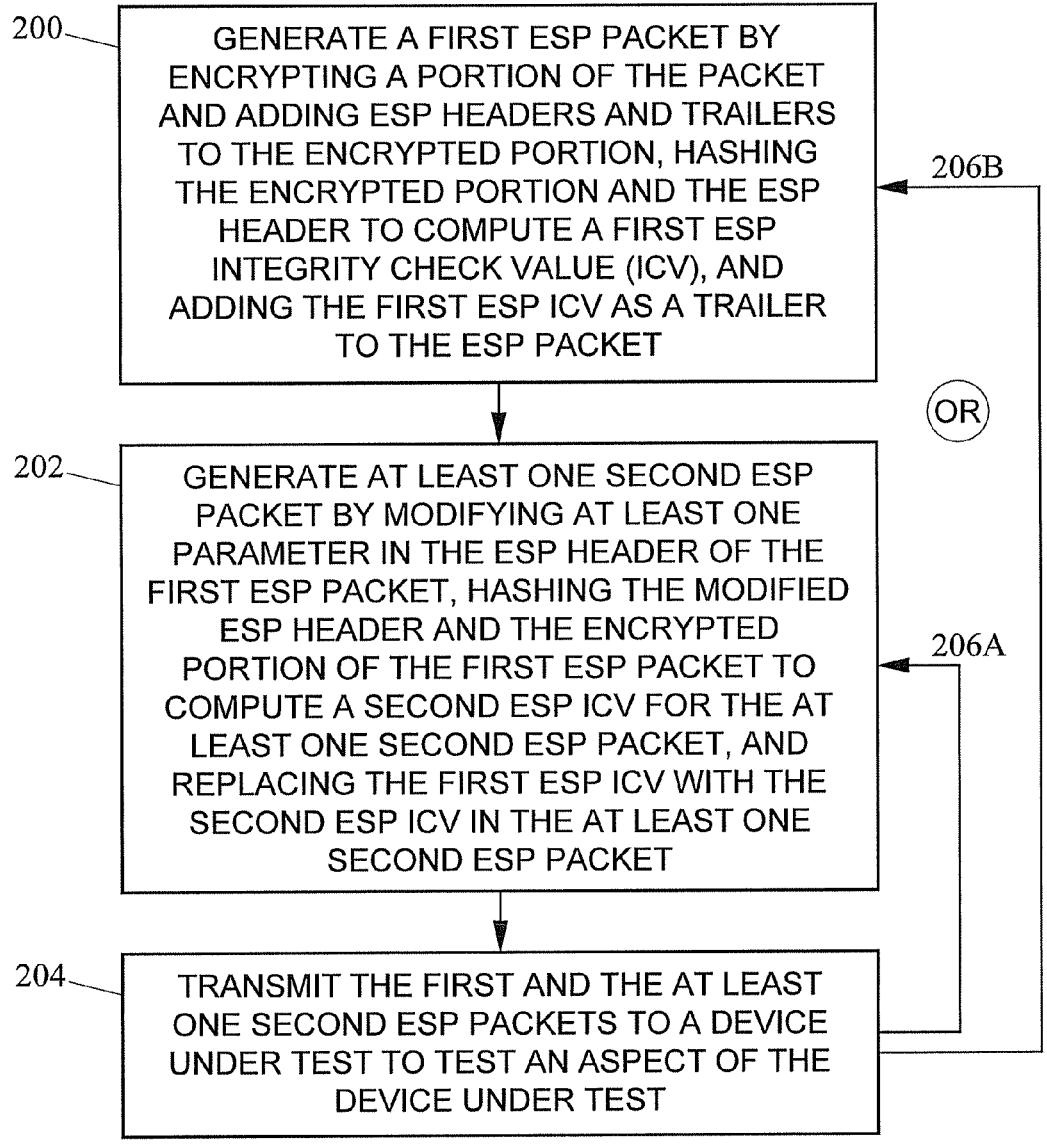
FIG. 2 is a flow chart of exemplary steps for performing ESP rehashing according to an embodiment of the subject matter described herein.

FIG. 2 is a flow chart of exemplary steps for performing ESP rehashing according to an embodiment of the subject matter described herein. In FIG. 2, at step 200, a first ESP packet is generated by encrypting a portion of the packet and adding ESP headers and trailers to the encrypted portion, hashing the encrypted portion and the ESP header to compute a first ESP integrity check value (ICV), and adding the first ESP ICV as a trailer to the ESP packet. The ESP packet includes a cleartext portion and an encapsulating portion, where the formerly cleartext portion has been encrypted (i.e., once encrypted may be referred to as the encrypted portion) and includes at least an inner IP header, inner UDP header, and inner payload. The outer portion includes at least an outer Ethernet header, an outer IP header, an ESP header, and an ESP trailer. The ESP header includes a security parameter index (SPI), a sequence number, and an initialization vector (IV), and the first ICV appended to the ESP packet after the ESP trailer.

An SPI may be unique to each traffic flow. An IV is a random string of bits used for encryption so that two packets having the same payload may be encrypted differently. This prevents an attacker trying to read the payload contents from using a decryption key for one packet to decrypt another packet.

At step 202, at least one second ESP packet is generated by modifying at least one parameter in the ESP header of the first ESP packet, hashing the modified ESP header and the encrypted portion of the first ESP packet to compute a second ESP ICV for the at least one second ESP packet, and replacing the first ESP ICV with the second ESP ICV in the at least one second ESP packet. For example, modifying the ESP header may include incrementing the sequence number. For example, SN incrementer 118 may increase SN 318 by a value of one. The second ICV may be computed by hashing the ESP header, the inner IP header, the inner UDP header, and the inner payload. It is important to re-generate the hash because it is hashed over the SN (as well as other data described herein) which was incremented (i.e., changed) in step 202. Therefore, because the data being hashed has changed, the hash will change. For example, hash module 110 may rehash the ESP packet by performing one or more mathematical operations using information contained in the ESP packet as input and produce a second ICV as output. The first ICV may be replaced with the second ICV in the ESP packet.

At step 204, the first and the at least one second ESP packets are transmitted to a device under test to test an aspect of the device under test. For example, output buffer 112 may transmit the first and the at least one second ESP packet to a device under test, such as a router, a server, or any other node that uses the ESP protocol. The ESP packets may be sent for performance testing, protocol compliance testing, etc.

In one embodiment, the number of times an ESP packet is rehashed may be configurable in order to achieve certain performance metrics. As shown in FIG. 2, in step 206A the process may return to step 202 for rehashing a rehashed ESP packet for a second time or alternatively, at step 206B, the process may return to step 200 where a complete ESP packet may be generated. For example, in order to test a network device, such as gateway 118, which requires a stateless packet stream of one million packets per second may require rehashing two-thirds of the packets. In other words, two out of every three packets may be rehashed and only one out of every three packets is newly generated according to conventional methods and associated with the processing resources and concomitant performance penalty associated with performing encryption operations. Similarly, if a device under test requires only one thousand packets per second, then perhaps only one of out every three thousand packets will be rehashed.

Figure 3:
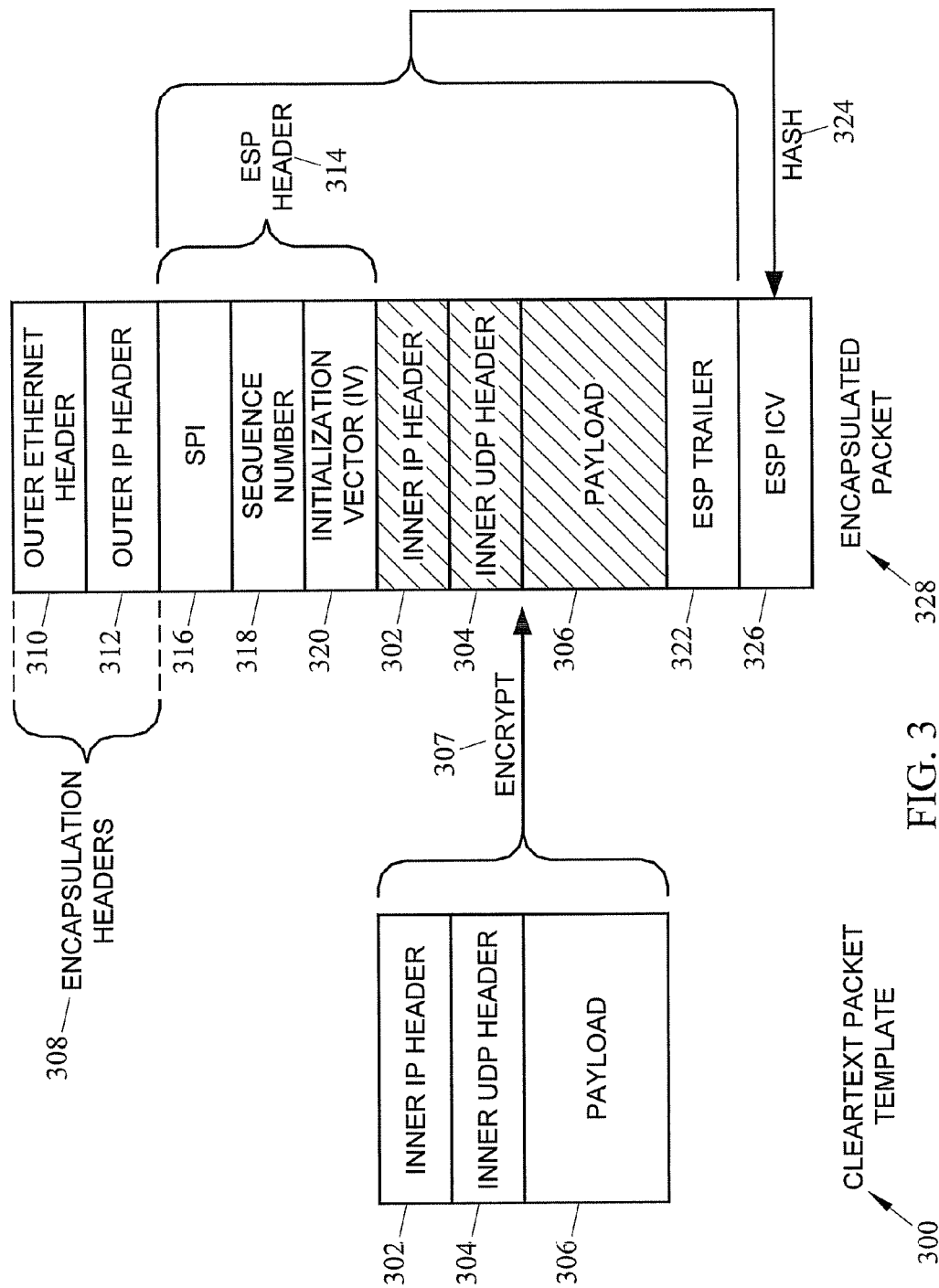
FIG. 3 is a packet sequence diagram illustrating generation of a complete ESP packet for performing subsequent ESP rehashing according to an embodiment of the subject matter described herein.

FIG. 3 is a sequence diagram illustrating generation of a complete ESP packet for performing subsequent ESP rehashing according to an embodiment of the subject matter described herein. In FIG. 3, cleartext packet template 300 may include inner IP header 302, inner UDP header 304, and payload 306. Additional parameters may also be included in cleartext packet template 300 without departing from the scope of the subject matter described herein but are omitted herein for clarity of discussion.

At step 307, cleartext packet 300 may be encrypted as indicated by the shading shown in FIG. 3. Encapsulating headers 308 may include outer Ethernet header 310, outer IP header 312, and ESP header 314. ESP header 314 may include security parameter index (SPI) 316, sequence number (SN) 318, and initialization vector (IV) 320. Appended to cleartext packet 300 may be ESP trailer 322.

At step 324, ESP header 314 and encrypted cleartext packet template 300 may be hashed in order to compute ESP ICV 326. ESP ICV 326 may then be appended to the packet after ESP trailer 322 in order to form complete ESP packet 328. Once at least one complete ESP packet has been generated, the ESP packet may be rehashed one or more times in order to avoid performing the encryption operations associated with generating the complete ESP packet. This may reduce the processing burden on the packet traffic generator and thus accelerate stateless IPsec traffic generation by performing ESP rehashing.

Figure 4:
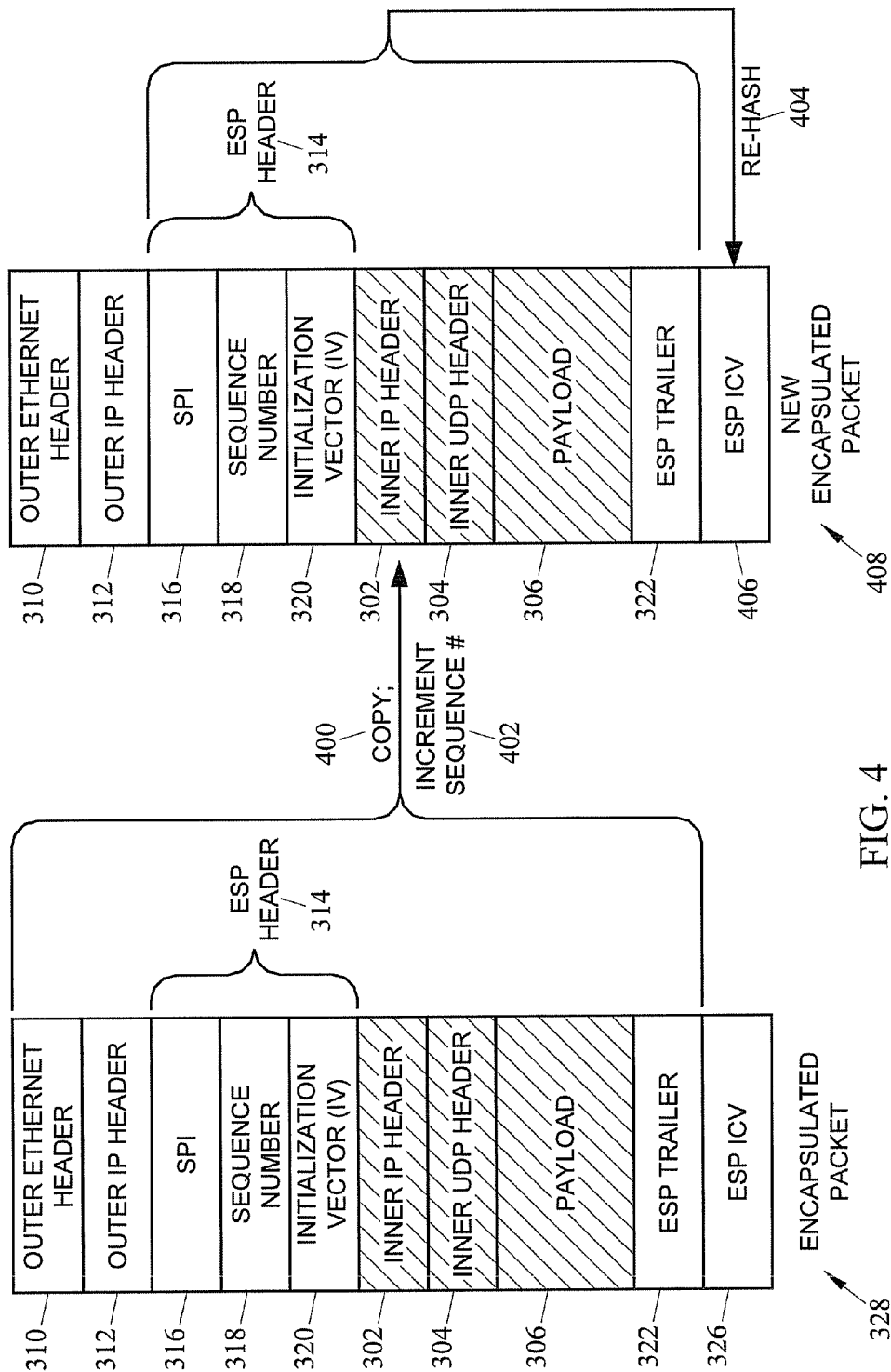
FIG. 4 is a packet sequence diagram illustrating generation of a rehashed ESP packet according to an embodiment of the subject matter described herein.

FIG. 4 is a sequence diagram illustrating generation of a rehashed ESP packet according to an embodiment of the subject matter described herein. Generating a rehashed ESP packet instead of generating a complete ESP packet may eliminate the need to perform encryption operations such as those performed in step 307 of FIG. 3. For example, in one embodiment, traffic generator 100 may alternate between generating a complete ESP packet and rehashing the previously generated ESP packet one or more times without repeating the encryption performed on the original ESP packet. In order to rehash an ESP packet, previously encapsulated packet 328 may be copied at step 400. For example, the contents of an allocated portion of output buffer 112 may be copied. At step 402, ESP sequence number 318 may be incremented and be stored in new ESP header 314. A new ICV may then be computed at step 404 over the output buffer portion starting with ESP header 314 and written to output buffer 112 in place of the previous ICV. For example, ICV module 116/hash module 110 may hash SPI 316, SN 318, IV 320, inner (encrypted) IP header 302, inner (encrypted) UDP header 304, and (encrypted) payload 306 in order to generate new ESP ICV 406. ESP ICV 406 may be written to output buffer 112 in place of ESP ICV 326 and output buffer 112 may be queued for transmission.

It will be understood that various details of the subject matter described herein may be changed without departing from the scope of the subject matter described herein. Furthermore, the foregoing description is for the purpose of illustration only, and not for the purpose of limitation, as the subject matter described herein is defined by the claims as set forth hereinafter.

What is claimed is:

1. A method for accelerating stateless Internet protocol security (IPsec) traffic generation by performing encapsulating security payload (ESP) rehashing of ESP packets, the method comprising:

generating a first ESP packet by encrypting a portion of the packet and adding an ESP header and an ESP trailer to the encrypted portion, hashing the encrypted portion and the ESP header to compute a first ESP integrity check value (ICV), and adding the first ESP ICV as a trailer to the ESP packet;

performing rehashing of the first ESP packet to generate at least one second ESP packet whereby the encrypted portion of the first ESP packet is used in the at least one second ESP packet without decrypting and re-encrypting the encrypted portion of the first ESP packet, wherein performing rehashing of the first ESP packet includes generating the at least one second ESP packet by modifying at least one parameter in the ESP header of the first ESP packet, hashing the modified ESP header and the encrypted portion of the first ESP packet to compute a second ESP ICV for the at least one second ESP packet, and replacing the first ESP ICV with the second ESP ICV in the at least one second ESP packet; and transmitting the first and the at least one second ESP packets to a device under test to test an aspect of the device under test.

2. The method of claim 1 wherein generating the first and the at least one second ESP packets includes one of generating a random initialization vector (IV) for each of the ESP packets and reusing the same IV for each of the ESP packets.

3. The method of claim 1 comprising dynamically adjusting a number of the at least one second ESP packets generated using the encrypted portion from the first ESP packet according to operator-configurable criteria.

4. The method of claim 1 wherein modifying at least one parameter in the ESP header includes incrementing the sequence number.

5. A packet traffic generator for accelerating stateless Internet protocol security (IPsec) traffic generation by performing encapsulating security payload (ESP) rehashing of ESP packets, the packet traffic generator comprising:

an ESP packet generation module that generates a first ESP packet by encrypting a portion of the packet and adding an ESP header and an ESP trailer to the encrypted portion, hashing the encrypted portion and the ESP header to compute a first ESP integrity check value (ICV), and adding the first ESP ICV as a trailer to the ESP packet;

an ESP rehashing module that performs rehashing of the first ESP packet to generate at least one second ESP packet whereby the encrypted portion of the first ESP packet is used in the at least one second ESP packet without decrypting and re-encrypting the encrypted portion of the first ESP packet, wherein performing rehashing of the first ESP packet includes generating the at least one second ESP packet by modifying at least one parameter in the ESP header of the first ESP packet, hashing the modified ESP header and the encrypted portion of the first ESP packet to compute a second ESP ICV for the at least one second ESP packet, and replacing the first ICV with the second ICV in the at least one second ESP packet; and an output buffer that transmits the first and the at least one second ESP packets to a device under test to test an aspect of the device under test.

6. The packet traffic generator of claim 5 comprising an initialization vector (IV) module that generates a random IV for each of the ESP packets and reusing the same IV for each of the ESP packets.

7. The packet traffic generator of claim 6 wherein the ESP rehashing module dynamically adjusts a number of the at least one second ESP packets generated using the encrypted portion from the first ESP packet according to operator-configurable criteria.

8. The packet traffic generator of claim 6 wherein the ESP rehashing module increments the sequence number.

9. A non-transitory computer readable medium having stored computer executable instructions that when executed by a processor of a computer cause the computer to perform steps comprising:

generating a first encapsulating security payload (ESP) packet by encrypting a portion of the packet and adding an ESP header and an ESP trailer to the encrypted portion, hashing the encrypted portion and the ESP header to compute a first ESP integrity check value (ICV), and adding the first ESP ICV as a trailer to the ESP packet;

performing rehashing of the first ESP packet to generate at least one second ESP packet whereby the encrypted portion of the first ESP packet is used in the at least one second ESP packet without decrypting and re-encrypting the encrypted portion of the first ESP packet, wherein performing rehashing of the first ESP packet includes generating the at least one second ESP packet by modifying at least one parameter in the ESP header of the first ESP packet, hashing the modified ESP header and the encrypted portion of the first ESP packet to compute a second ESP ICV for the at least one second ESP packet, and replacing the first ESP ICV with the second ESP ICV in the at least one second ESP packet; and transmitting the first and the at least one second ESP packets to a device under test to test an aspect of the device under test.

10. The non-transitory computer readable medium of claim 9 wherein generating the first and the at least one second ESP packets includes one of generating a random initialization vector (IV) for each of the ESP packets and reusing the same IV for each of the ESP packets.

11. The non-transitory computer readable medium of claim 9 comprising dynamically adjusting a number of the at least one second ESP packets generated using the encrypted portion from the first ESP packet according to operator-configurable criteria.

12. The non-transitory computer readable medium of claim 9 wherein modifying at least one parameter in the ESP header includes incrementing the sequence number.

* * * * *